United States Patent [19]

Bader

[11] Patent Number: 4,802,271
[45] Date of Patent: Feb. 7, 1989

[54] WREATH MAKING MACHINE

[76] Inventor: Richard Bader, 2002 Parkfield Dr., West Bend, Wis. 53095

[21] Appl. No.: 76,531

[22] Filed: Jul. 22, 1987

[51] Int. Cl.⁴ .............................................. B23P 11/00
[52] U.S. Cl. ................................................. 29/243.56
[58] Field of Search .............................. 269/158, 238; 29/243.52, 243.56; 53/138 R, 138 A

[56] References Cited

U.S. PATENT DOCUMENTS

| | | | |
|---|---|---|---|
| 378,893 | 3/1888 | McIntyre | 269/158 |
| 1,799,526 | 4/1931 | Nylander | 269/158 |
| 2,487,475 | 11/1949 | Powers | 29/243.56 |
| 3,160,890 | 12/1964 | Lefebvre | 29/243.56 |
| 3,608,885 | 9/1971 | Roth | 269/158 |

OTHER PUBLICATIONS

"Helpful Tips on Making Beautiful Wreaths the Easy Way . . . with Genuine Hillman Wreath Rings and Crimpings Machines", A. F. Hillman Wreath Ring Co., Inc.

"Our Customers Get Framed!. . . Shouldn't You?", A. F. Hillman Wreath Ring Co., Inc.

*Primary Examiner*—Robert C. Watson
*Attorney, Agent, or Firm*—Andrus, Sceales, Starke & Sawall

[57] ABSTRACT

An apparatus for making wreaths utilizing a wreath frame having a plurality of upstanding clips for receiving and being crimped about a bunch of greens. The apparatus includes a support structure having a work surface, with a pair of opposed pivotable jaws disposed adjacent the work surface. The jaws are pivotable between an open position for receiving a clip therebetween, and a closed position in which the jaws crimp the clip about the bunch of greens. An actuator mechanism is provided for causing the jaws to pivot from their open position to their closed position. The actuator mechanism is operable by the operator of the apparatus pushing the actuator mechanism away from his or her body with a foot, which can be accomplished from a sitting position. The jaws are provided with a face portion, with each face portion having a groove for accepting and retaining a clip therein during movement of the jaws from the open to closed positions.

9 Claims, 3 Drawing Sheets

WREATH MAKING MACHINE

BACKGROUND AND SUMMARY

This invention relates to wreath making machines, and more particularly to a wreath making machine used in conjunction with a wreath frame having a plurality of clips for receiving greens or the like, from which the wreath is formed.

In making wreaths, it is known to use a wreath frame, typically circular, which includes a plurality of clips for retaining greens or the like on the frame. Each clip generally has a base member connected to the frame, such as by welding, and a pair of spaced arms extending upwardly from the base member and away from the frame. The clips are adapted to receive greens or the like between the spaced arms, and are crimped about the greens for retaining the greens on the frame. A wreath is formed by affixing greens to the frame in this manner at each clip about the circumference of the frame.

Previous devices for crimping the clips about the greens utilize a pair of opposed pivotable jaws which engage the elbows formed on the clip at the joint between the upstanding arms and the base member. Upon closing of the jaws, the elbows are thrust upwardly to clamp the greens therebetween, thereby forming an area in the shape of a parallelogram for receiving the greens. The crimping of the clip about the greens is performed by the user stepping on a foot-operated pedal connected to an actuator mechanism. The stepping motion is substantially vertical, and requires the operator to be in a standing position when making the wreaths. Such a construction is tiring and fatiguing, since there are repeated crimpings to be performed during making of a wreath. When engaged in a production run, the operator easily tires from this repeated up-down stepping motion necessary to actuate the crimping jaws.

The present invention provides a more secure clamping action on the greens by the clip, and also provides a more ergonometrically satisfactory mechanism for operating the jaws of the crimping device. In accordance with the invention, a pair of opposed movable jaws are connected to a support structure. The jaws are movable between an open position for receiving the clip therebetween and a closed position for crimping the clip about the greens. The jaws are capable of crimping the clip such that the ends of the clip arms are forced downwardly toward the base member by the jaws during movement of the jaws from the open position to the closed position. In this manner, the clip is securely crimped about the greens.

An actuator means is operably connected to the jaws for causing the jaws to moved from the open position to the closed position. The actuator means is engageable by a foot of the operator of the apparatus and is operable in such a way that the user pushes the actuator means away from the operator's body in order to cause the jaws to move from the open position to the closed position. The actuator means is preferably disposed below the jaws and the support structure, so that the operator can be in a sitting position and is merely required to push the actuator means away from the body with the foot from the sitting position. This operation of the device alleviates stress on the operator, and enables the operator to engage in lengthy production runs without tiring.

Brief Description of the Drawings

The drawings illustrate the best mode presently contemplated of carrying out the invention.

In the drawings

DETAILED DESCRIPTION OF THE PREFERRED EMBODIMENT

Figure 1:
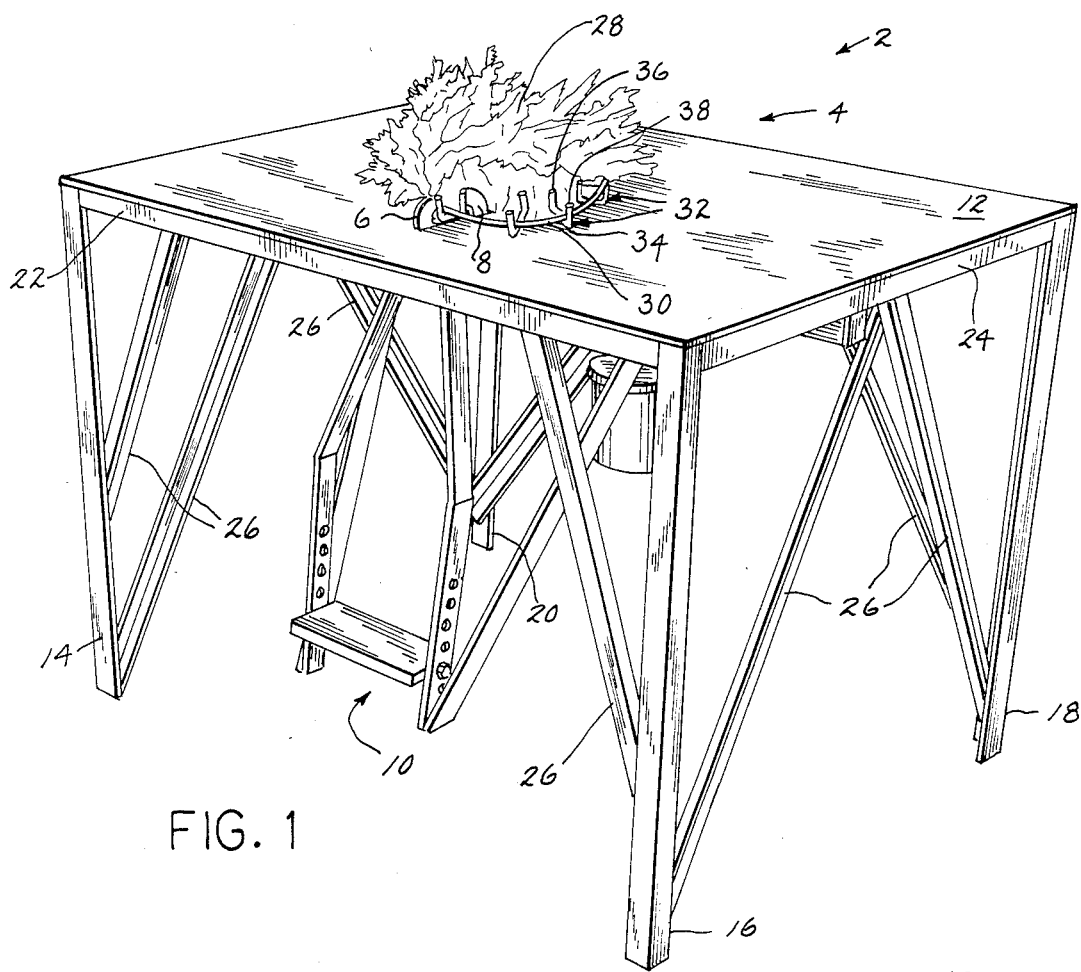
FIG. 1 is a perspective view of the wreath making apparatus of the present invention.
Figure 5:
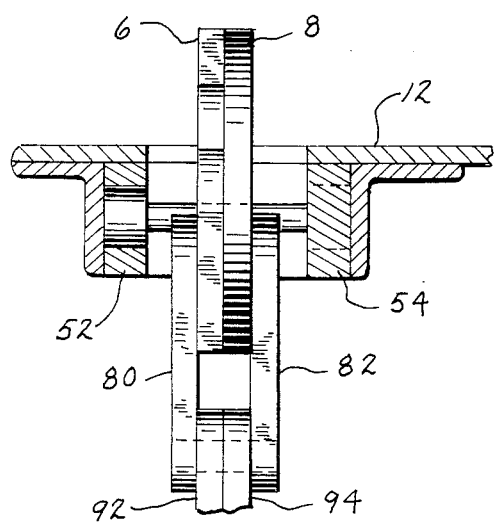
FIG. 5 is an enlarged frontal elevation view of the jaws of the wreath making machine, taken generally along line 5—5 of FIG. 4.

As shown in FIG. 1, a wreath making apparatus 2 generally includes a table 4, a pair of opposed pivotable jaws 6 and 8, and an actuator mechanism 10 for operating jaws 6 and 8. Table 4 includes a platform work surface 12 affixed to a support structure. The support structure includes legs 14, 16, 18 and 20 having a plurality of top members, such as 22, 24, spanning therebetween. A plurality of brace members 26 extend between legs 14–20 and the top members such as 22, 24, for providing stability to the table 4.

Wreath making apparatus 2 is intended for use in making wreaths, such as that shown partially completed at 28, utilizing a circular wreath frame 30. Wreath frame 30 has a plurality of clips 32 connected thereto. Clips 32 each include a base member 34 connected to wreath frame 30, with each base member 34 being provided with a pair of spaced upstanding arms 36, 38. Each clip 32 is adapted to receive a bundle of greens or the like between spaced arms 36 and 38.

Figure 4:
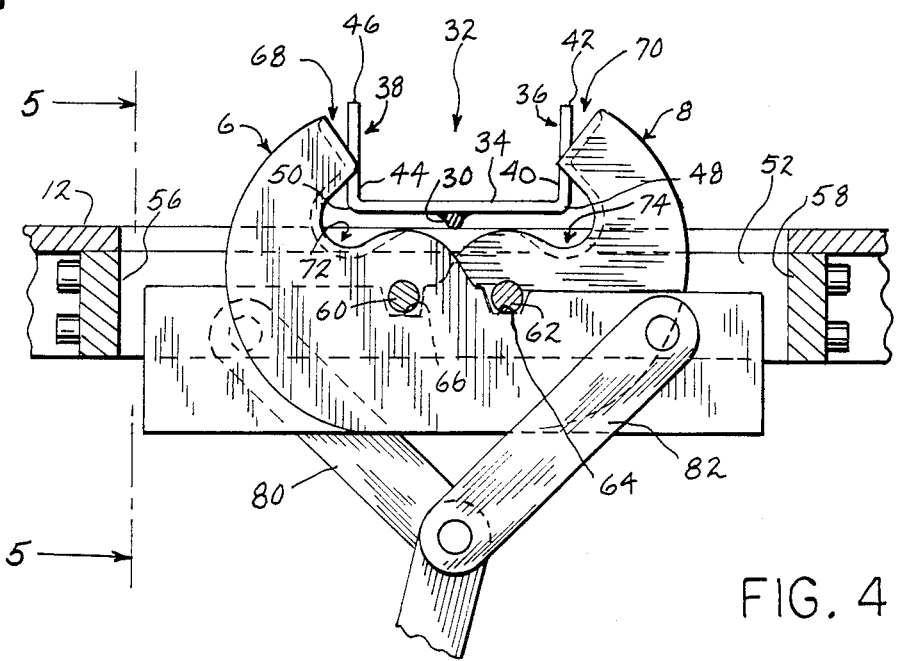
FIG. 4 is an enlarged detail side view of the opposed movable jaws of the wreath making machine, taken generally along line 4—4 of FIG. 3.

With reference to FIG. 4, arm 36 has a proximal end 40 connected to base member 34, and a distal end 42 spaced therefrom. Likewise, arm 38 has a proximal end 44 connected to base member 34, and a distal end 46 spaced therefrom. A pair of elbows 48, 50 are formed at the connection of spaced arms 36, 38 to base member 34, respectively.

Jaws 6 and 8 are mounted in a frame having side members 52, 54 and end members 56, 58 spanning therebetween. A pair of cross members 60, 62 span between side members 52 and 54 of the jaw-supporting frame, and are adapted to mate with openings provided in jaws 6 and 8, respectively. In this manner, jaws 6 and 8 are pivotable within the jaw supporting frame between their open and closed positions. Each of jaws 6 and 8 is provided with an indentation 64, 66, respectively, which accommodates cross members 62, 60, respectively when jaws 6 and 8 are in their open position.

Jaws 6 and 8 each have face portions 68, 70, respectively. Face portions 68, 70 include rounded indentations 72, 74, respectively. Indentations 72, 74 are adapted to receive elbows 50, 48, respectively, of clip 32 during movement of jaws 6 and 8 from their open position to their closed position.

Figure 2:
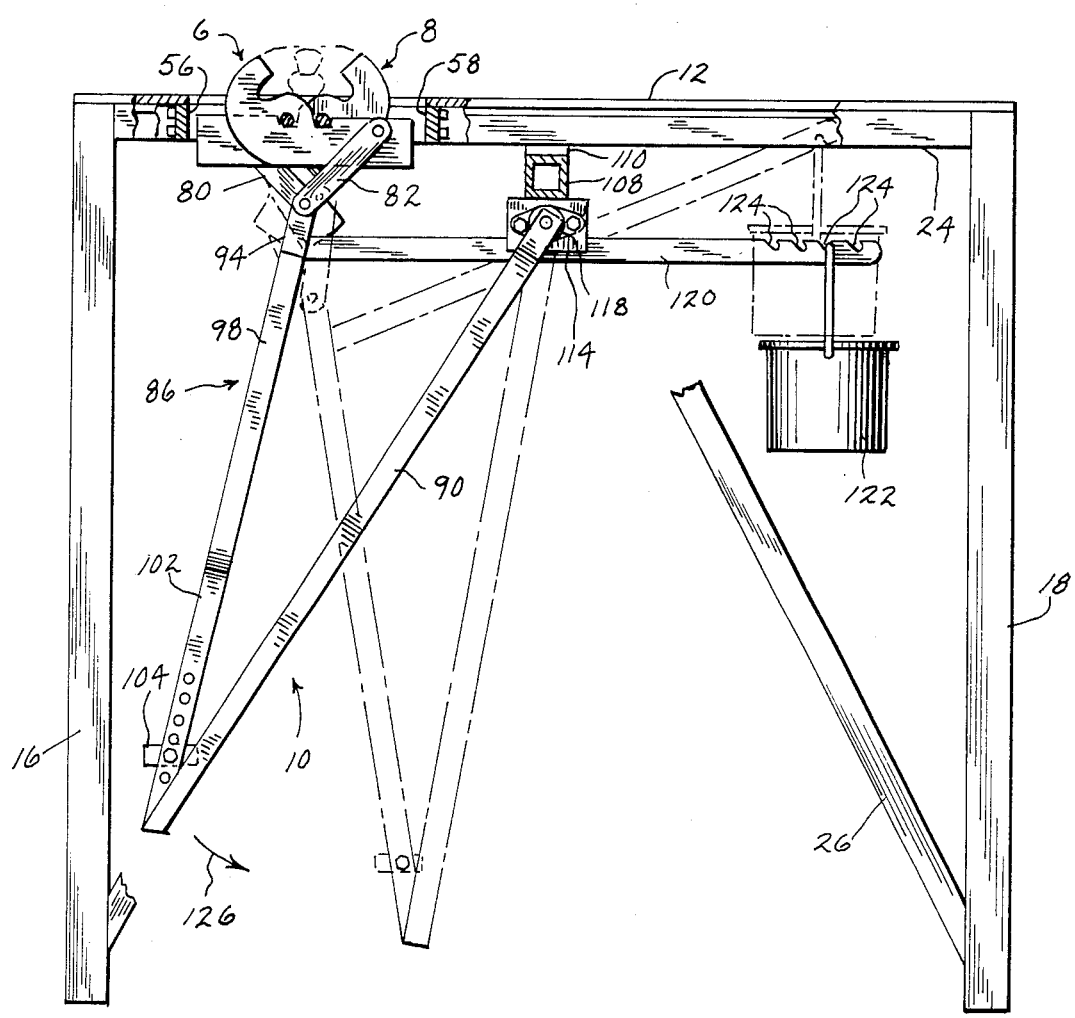
FIG. 2 is a side elevation view of the apparatus of FIG. 1, with portions broken away.

Referring to FIG. 2, jaws 6 and 8 are pivotable between an open position as shown and a closed position, shown in phantom. In their open position, jaws 6 and 8 are adapted to receive a clip 32 therebetween, as shown in FIG. 4. When moved to their closed position, jaws 6 and 8 crimp clip 32 about a bundle of greens placed between arms 36 and 38, to affix the greens to frame 30. Indentations 72, 74 are in substantial alignment when jaws 6 and 8 are in their closed position, and define an opening to which clip 32 is forced to conform when jaws 6 and 8 are moved from their open position to their closed position to crimp clip 32 about the greens contained therein.

Figure 6:
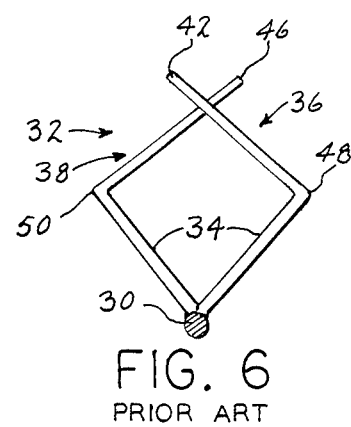
FIG. 6 is a detail view, partially in section, showing a wreath clip as crimped about a bundle of greens by prior art crimping devices.
Figure 7:
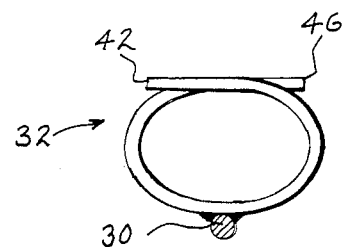
FIG. 7 is a detail view similar to FIG. 6, showing a wreath clip as crimped about a bundle of greens by the wreath making machine of the present invention.

During movement of jaws 6 and 8 from their open position to their closed position, distal ends 42, 46 of arms 36, 38, respectively, are forced downwardly toward base member 34 to securely crimp clip 32 about the bundle of greens. Indentations 72, 74 cooperate to force clip 32 to attain the configuration shown in FIG. 7, which is substantially elliptical with portions of arms 36 and 38 overlapping. This action is in contrast to the crimping of clip 32 as shown in FIG. 6, wherein the angle between arms 36, 38 and base member 34 is left substantially intact, and wherein elbows 48, 50 are simply thrust upwardly to cause distal ends 42, 46 of arms 36, 38 to overlap and to crimp the bundle of greens therebetween. The crimping action of wreath making apparatus 2 according to of the invention, as shown in FIG. 9, provides a much more secure crimp of the greens to the frame 30.

Figure 8:
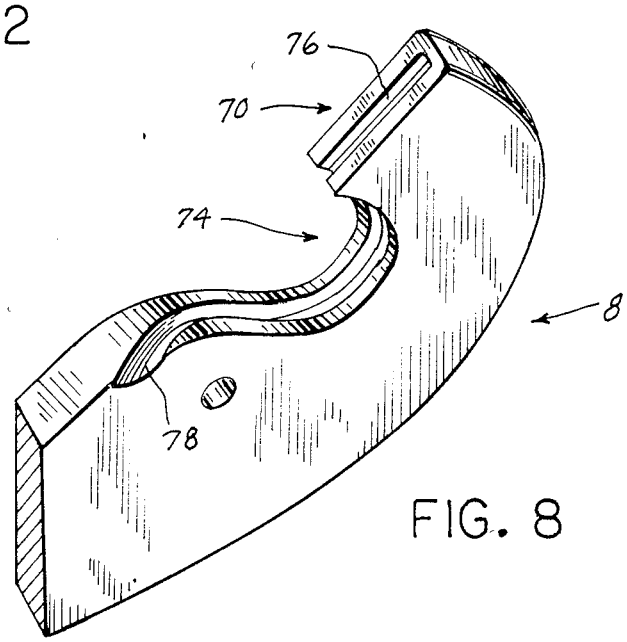
FIG. 8 is an enlarged perspective view of one of the jaws of the present invention.

With reference to FIG. 8, face 70 of jaw 8 is provided with a longitudinal groove 76. Groove 76 extends substantially along the entire face 70 of jaw 8, and is intended to receive and provide a detent for clip 32 during movement of jaw 8 from its open position to its closed position. A lower portion 78 of groove 6 is curved inwardly so that, when jaws 6 and 8 are in their side by side position, inwardly curved portion 78 leads to jaw 6. Face portion 68 of jaw 6 is also grooved similarly to jaw 8, and has an inwardly curved lower portion which, when jaws 6 and 8 are in their closed position, leads into lower portion 78 of groove 6 in jaw 8. In this manner, when jaws 6 and 8 are in their closed position, clip 32 is encased within the grooved areas of jaws 6 and 8 and is prevented from moving sidewards relative to jaws 6 and 8.

Figure 3:
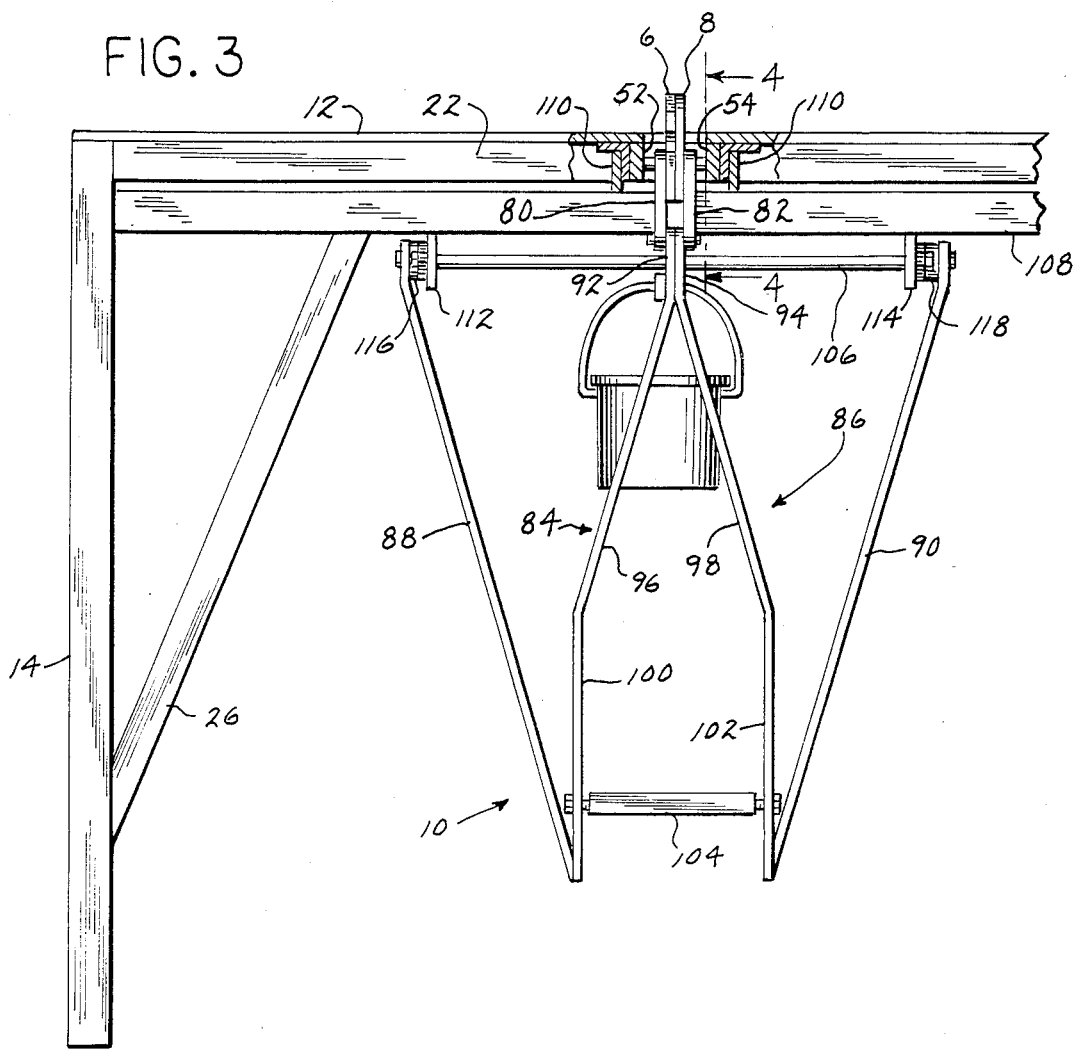
FIG. 3 is a partial front elevation view of the wreath making apparatus of FIG. 1, with portions broken away.

Referring to FIGS. 2 and 3, actuator mechanism 10 includes a pair of links 80, 82, a pair of actuator members 84, 86, and a pair of brace members 88, 90. Links 80, 82 are pivotably connected at one end to the ends of jaws 8 and 6 spaced from face portions 68, 70, respectively. Links 80 and 82 are each provided with an opening which accommodates a pin extending sideward from jaw members 8 and 6, respectively. Links 80 and 82 are each connected at their other end to the upper ends of actuator members 84, 86, again by a pin and opening connection.

Referring to FIG. 3, actuator members 84 and 86 have top portions 92, 94, respectively, which are adapted for placement against one another between the lower ends of links 80, 82. Extending below top portions 92, 94 are intermediate diverging portions 96, 98, which lead to lower parallel portions 100, 102. A foot pedal 104 is pivotably connected to the lower ends of lower parallel portions 100, 102, and is disposed therebetween. With reference to FIG. 2, lower portions 100, 102 are provided with a series of openings to accommodate foot pedal 104 at varying positions there along.

Brace members 88, 90 are rigidly connected to the lower ends of lower parallel portions 100 and 102 of actuator members 84, 86, such as by welding or the like. Brace members 88, 90 extend rearwardly of actuator members 84, 86 and are disposed at an angle thereto, as shown in FIG. 2. Brace members 88, 90 are connected at their upper ends to the outer ends of a transverse axle 106 (FIG. 3). Brace members 88, 90 extend upwardly toward transverse axle 106 at an angle to lower parallel portions 100, 102 of actuator members 84, 86. This arrangement of brace members 88, 90 provides lateral stability to the lower end of actuator assembly 10.

Transverse axle 106 is connected to the underside of table 4 by means of a transverse tube member 108 connected at its end portions to connector plates, such as 110 (FIG. 2). A pair of brackets 112, 114 are connected to the underside of transverse tube 108, and have openings adapted to receive the end portions of transverse axle 106. Bearing assemblies 116, 118 are adapted for placement on the ends of transverse axle 106, to facilitate ease of rotation of axle 106. Transverse axle 106 thus provides a fixed point of rotation for the upper ends of brace members 88, 90.

A counterweight support member 120 and a counterweight 122 are provided to bias actuator mechanism 10 to a position whereby jaws 6 and 8 are normally open. Counterweight support member 120 is rigidly connected at one end to top portion 92 of actuator member 84. Counterweight support member 120 is supported intermediate its length by transverse axle 106, such as by a plate connected to the top of support member 120 having an opening to accommodate passage of transverse axle 106 therethrough. Counterweight support member 120 extends beyond axle 106 to support counterweight 122. A series of notches 124 are provided at the end of counterweight support member 120, to accommodate different placements of counterweight 122. It is understood that the described counterweight mechanism may be replaced by a torsion spring or any other satisfactory mechanism which acts to bias jaws 6 and 8 to a normally open position.

In operation, the actuator mechanism 10 is operated by the operator of wreath making apparatus 2 placing his or her foot on pedal 104 after clip 32 has been inserted between open jaws 6 and 8, as shown in FIG. 4. The operator then pushes the foot away from the body in the direction shown at arrow 126 in FIG. 2. The operator continues this motion until actuator mechanism 10 attains the position shown in phantom in FIG. 2. During this motion of actuator mechanism 10, brace members 88, 90 pivot about transverse axle 106, thereby causing acuator members 84, 86 to move downwardly and create a scissors motion in links 80, 82 by pulling the lower ends of links 80, 82 downwardly. This scissors motion of links 80, 82 draws the ends of jaws 6 and 8 downwardly, to cause jaws 6 and 8 to move to their closed position. As above described, when jaws 6 and 8 are so moved, clip 32 is crimped about the bunch of greens inserted therein as shown in FIG. 9.

After actuator mechanism 10 has attained the position shown in phantom in FIG. 2, the operator removes his or her foot from foot pedal 104. Thereafter, counterweight 122 causes actuator mechanism 10 to return to its original position, and thereby cause jaws 6 and 8 to return to their open position for again receiving another of clip members 32 so that the above-described steps can be repeated. Varying the position of counterweight 122 along the length of counterweight support member 120 by using notches 124 increases or decreases the force with which actuator mechanism 10 is returned to its original position, as desired by the operator.

Various alternatives are contemplated as being within the scope of the following claims particularly pointing out and distinctly claiming the subject matter regarded as the invention.

I claim:

1. An apparatus for making wreaths or the like, said wreaths being formed on a frame having a plurality of clips for retaining greens or the like on said frame, each said clip having a base member connected to said frame and a pair of spaced arms extending therefrom, each said arm having a proximal end connected to said base member and a distal end spaced therefrom, said clip being adapted to receive said greens or the like between said spaced arms, said apparatus comprising:
    a support structure including a platform-like upper work surface;
    a pair of opposed movable jaws maintained in a fixed position relative to said support structure adjacent said work surface, said jaws being movable between an open position for receiving said clip therebetween and a closed position for crimping said clip about said greens or the like, each said jaw having a face portion for engaging said clip during movement of said jaws from said open position to said closed position, said face portion of each said jaw having an arcuate indentation formed therein, said indentations cooperating during movement of said jaws from said open position to said closed position to securely crimp said clip about said greens or the like by forming said clip to a substantially elliptical shape with portions of said clip overlapping; and
    actuator means connected to said jaws and operable to cause said jaws to be moved from said open position to said closed position, said actuator means being interconnected with said support structure below said upper work surface.

2. The invention according to claim 1, wherein said jaws are mounted for pivotable movement between said open and said closed positions.

3. The invention according to claim 2, wherein said face portions of said jaws are grooved to accept said clip arms when said jaws are in said open position.

4. The invention according to claim 1, wherein said actuator means is disposed below said support structure and is engageable by a foot of the operator, and wherein the operator pushes said actuator means away from the operator's body in order to cause said jaws to move from said open position to said closed position.

5. The invention according to claim 4, wherein said actuator means comprises:
    a pair of links, with each said link being pivotably connected at one end to one of said jaws;
    an elongated actuator member having an upper end and a lower end, with said links being pivotably connected at their other end to said upper end of said actuator member; and
    an elongated brace member rigidly connected at one end to said actuator member and pivotably connected at its other end to an actuator support, so that said actuator means operates to cause said jaws to pivot from their open position to said closed position when the operator of said apparatus engages a foot with said actuator member and pushes said actuator member away from the operator's body, to thereby cause said actuator member and said brace member to pivot about said actuator support and the upper end of said actuator member to move downwardly, to thereby create a scissors motion in said pair of links so as to cause said pair of jaws to pivot to said closed position.

6. The invention according to claim 5, wherein said lower end of said elongated actuator member is provided with foot engagement means for engagement by a foot of the operator.

7. The invention according to claim 6, wherein said elongated actuator member comprises a pair of spaced members extending below said support structure, and wherein said foot engagement means is disposed between said opposed members adjacent the lower ends thereof.

8. The invention according to claim 2, further comprising bias means for causing said jaws to return to said open position upon release of said actuator means after said jaws have been pivoted to said closed position.

9. The invention according to claim 8, wherein said bias means for causing said jaws to return to said open position comprises a counterbalancing weight mechanism connected to and extending from said actuator means.

* * * * *